May 4, 1954  H. D. SMYTH ET AL  2,677,770
ION SOURCE
Filed Feb. 25, 1953
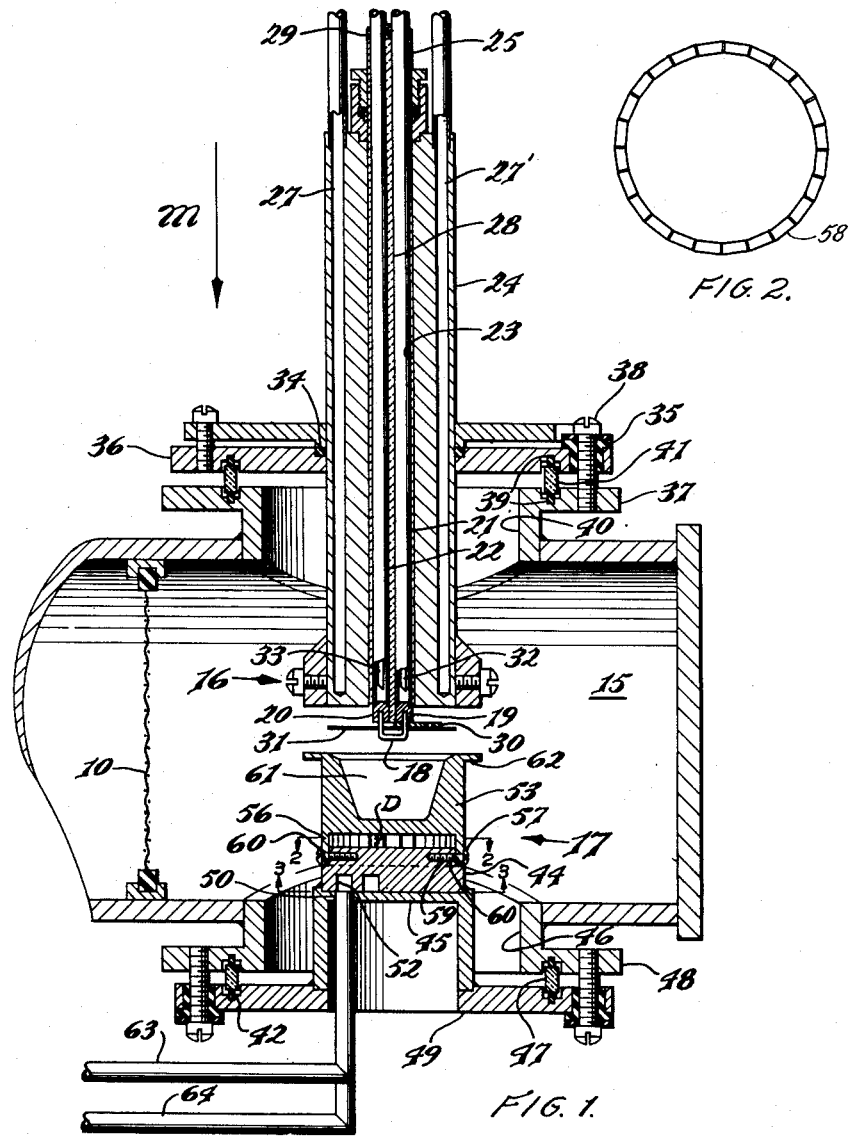
FIG. 2.
FIG. 1.
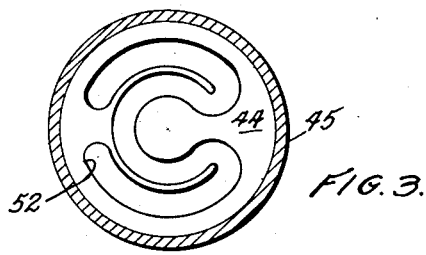
FIG. 3.
Inventors
Lincoln G. Smith
H. D. Smyth
Julian E. Mack
By Roland A. Anderson
Attorney Patented May 4, 1954

2,677,770

UNITED STATES PATENT OFFICE 2,677,770

ION SOURCE

Henry D. Smyth, Washington, D. C., Lincoln G. Smith, East Moriches, N. Y., and Julian Ellis Mack, Madison, Wis., assignors to the United States of America as represented by the United States Atomic Energy Commission Application February 25, 1953, Serial No. 338,714

6 Claims. (Cl. 250—41.9)

This application is a continuation-in-part of application Serial No. 77,874 filed February 23, 1949, now abandoned, and discloses an invention which relates to metallic ion sources and in an important aspect relates to means and procedures for generating substantial ions of multi-isotopic metals including such source metals as cobalt including the isotopes 59 and 60, copper including the isotopes 63 and 65, and uranium isotopes 234, 235, 237 and 238. Such means for generating ions are required in apparatus for separating or concentrating isotopes of single mass by appropriate selective operations upon the ions of different atomic mass contained in an ion beam.

In carrying out the separation of the several isotopes of a metal various arrangements have been proposed for deflecting or classifying positive ions of the source metal, e. g., by the influence of specially designed or controlled magnetic or electrostatic fields so that a separation of the ions and thus of the isotopes is produced in accordance with their mass or charge ratio. To provide in such a procedure a substantial yield of the desired isotope, ion beams of high intensity or very high ion current density are required, i. e., ion currents of the order of 10 milliamperes or preferably much more are necessary.

In some of the isotopic metals which contain isotopes useful for medical, research or industrial purposes, the particularly desired isotope may be contained as a very low percentage of the metal content. Consequently, a large amount of metal must be vaporized and ionized to obtain the required quantity of the desired isotope. Further, for quantity production, the ion source must be capable of continuous and uniform operation for extended durations of time. In addition, the ions must be produced under evacuated conditions at relatively low pressures and structural problems arise with regard to cooling of the various component parts, replacing worn-out parts and in the feeding of the source metal to be ionized.

Among the various conceivable types of ion sources, an arc is of particular advantage in that it not only provides a supply of electrons to effect ionization by collision, but also affords a relatively high temperature to facilitate the necessary vaporization of the source metal for production of ions from solid or molten bodies of the metal. However, extensive tests have now revealed that a number of difficulties are encountered in attempting to employ an arc for such purpose, particularly where it is necessary to provide for the feeding of fresh metal to the arc as the ions are generated and withdrawn for use. In the first place, it has been found that an arc source for generating ions from source metals must be one at a very high temperature, the melting point of copper, cobalt and uranium being found to lie in the neighborhood of from between 1100° C. and 1400° C. and the vapor pressure of uranium, for example, being not more than $1.9 \times 10^{-2}$ mm. of mercury even at a temperature of the order of 1900° C.

It has also been found as a result of extensive research that some source metals react with many metals and in particular forms extremely stable carbides or oxides so that attempts to use graphite or any other refractory oxide as a support or a boat of the molten metal in the arc have given trouble leading to contamination in the ion beam and a waste of the metal. Moreover, these source metals form alloys with a great many of the metals including aluminum, iron, tantalum, vanadium, molybdenum, tungsten and a number of others so that the alloying influence of the molten source metal is a serious factor, primarily evidenced by a tendency to destroy rapidly any of the supporting structures made of these metals by reducing their melting temperature as a result of the formation of the alloy. In view of these difficulties and other electro-deterioration influences, such as are due to severe electronic and ionic bombardment characteristics of an arc, the possibility of providing a stable, long-lived arc source of source metal ions generated directly from the source metal has not been promising utilizing the disclosures and teachings of the prior art.

It was found, however, as a result of extensive research that the foregoing difficulties could be overcome by periodically depositing controlled quantities of source metal into the arc discharge or onto an anode, of the arc discharge, formed principally of tungsten, the amount of source metal being deposited at any one time being insufficient to form an alloy with the tungsten of the anode that has a contamination high enough to materially reduce its melting temperature. While apparatus constructed as a result of this discovery operates in a satisfactory manner over long periods of time to produce a copious supply of ions of the source metal, certain operational and constructional difficulties are presented by virtue of the fact that the source metal must be periodically or continuously fed into the evacuated arc region through the housing.

It occurred that these difficulties in feeding the source metal to the ion source might be avoided through the employment of a large massive block of source metal which could be cooled by conduction and radiation to prevent an undue melting by the heat of the arc discharge to avoid excessive alloying or reaction with the support material; provided also a suitable magnetic field be employed to collimate the electrons of the arc discharge and to confine the arc to a small region on the massive source metal anode with the vaporization of the source metal being restricted to this small region. It was found in conducting research on this idea that the anode could be too well cooled, thereby causing instability of the arc through the reduction of the source metal vapor pressure. Accordingly, an ion source structure was developed that comprised an anode consisting of a solid block of source metal supported in a cup-like container, this container being secured to a water cooled platform by means of a plurality of thermally conductive strips. The lateral surface of each of the strips are adapted to be separately brought into thermal conductive relation with said water-cooled platform to provide a precise control of the heat interchange between the cup-like container and the table whereby the temperature of said anode may be regulated.

It is therefore an important object of this invention to provide an improved arc source of isotopic metal ions wherein a continuous ionization may be obtained from a relatively large, massive quantity of the source metal constituting the anode of the arc discharge by confining the arc to a relatively small region on the anode surface.

A further object of this invention is to provide an improved arc source of source metal ions wherein a continuous ionization may be obtained from a relatively large mass of source metal that is contained in a vessel secured to a liquid-cooled support through a member having an adjustable thermal conductive relation therewith.

To these and other ends, such as are hereinbefore apparent, or incidental to the practice and structure of the described improvements, an important feature of the invention resides in the discovery that a suitable temperature differential may be maintained between the molten surface of the anode spot of an arc source of source metal ions and the supporting structure for the anode material, by providing a suitable massive anode and by precisely controlling the heat transfer between said anode and its supporting structure.

These and other features of the invention including a number of useful structural arrangements which are believed to be novel are more particularly disclosed in the following description of certain presently preferred embodiments of the invention set forth by way of example and illustrated in the annexed drawing, wherein:

Figure 1 is a sectional view of an ion source embodying the principles of this invention;

Figure 2 is a cross sectional plan view of the thermally conductive supports for the anode cup illustrated in Figure 1, the section being taken on lines 2—2, Figure 1; and Figure 3 is a cross sectional plan view showing the arrangement of the cooling duct for the anode support the section being taken on lines 3—3 of Figure 1.

Referring now to the drawings and more particularly to Figure 1, the ion source illustrated is contained within a chamber indicated generally at 15, which chamber is adapted to house the component parts of the ion utilization apparatus, e. g., the isotron or other suitable ionic isotope separator and is evacuated and sealed at a low subatmospheric pressure.

The details of the ion utilization apparatus are not disclosed in the drawings since they form no part of the present invention, but include as an adjunct an ion accelerating electrode schematically indicated at 10 in the drawing of Figure 1 and shown maintained at a high positive potential relative to the potential of the arc electrodes. It is preferred to have that part of the chamber 15 that supports the ion source insulated from the part of the chamber containing the accelerating electrode and the other component parts of the ion classifying apparatus, so that the ion source electrodes may be maintained at a positive potential of the order of 20,000 volts with the remaining portion of the chamber at ground potential thus establishing the electric field for withdrawing and accelerating the ions from the region of the arc.

The component parts of the ion source may be regarded as consisting essentially of two main parts, the cathode assembly 16 and the anode assembly 17. The cathode proper consists in the illustrated embodiment of a U-shaped filament 18, opposite ends of which are shown retained in suitable supporting chucks 19 and 20, each of which are respectively inserted, and soldered or otherwise secured, into an end of the tubular lead-in electrodes 21 and 22. These lead-in electrodes formed preferably of copper or other material of good thermal conductivity are retained within a centrally drilled opening 23 of the cylindrical block 24 formed of steel or other suitable magnetic material. This central opening 23 is lined with a glass sleeve 25 which is shown supported and sealed in place by means of the packing gland. A pair of cylindrical channels 27 and 27′ are drilled into the cylindrical block at diametrically spaced points for supporting squirt tubes (not shown) for cooling the block 24. A transverse member 28, also of glass is inserted into the sleeve 24 between the two electrodes 21 and 22 to retain the two lead-in electrodes in spaced apart and insulated relation. The point where the ends of the electrodes project exteriorly of the glass tube is sealed by a suitable Bakelite washer 29 which may be wax sealed to the glass sleeve 25 and to the lead-in electrodes in the manner shown in the drawing.

In order that the ends of the filament that are recessed into the blocks 19 and 20 may be shielded from the arc plasma to inhibit bombardment of this portion of the filament by the ions thereof, a plate 30 is shown secured to the plug 19 by being soldered thereto, for example, so that suitable shielding plates 31 may be attached in the manner indicated. Since it is desirable also to keep the ends of the filament that are imbedded in the blocks 19 and 20 relatively cool to inhibit electron emission from the filament, suitable squirt tubes 32 and 33 are provided for each of the lead-in electrodes 21 and 22 and conduct a cooling fluid, e. g., water, adjacent the inside surface of the blocks 19 and 20 to remove the heat of the filament at its ends. The cylindrical block 24 and the cathode assembly 16 are supported by the packing gland 34 so that the position of support for the cathode assembly may be adjusted. The plate 36 of the packing gland 34 is secured to the flange 37 of the opening 40 of the chamber 15 through the glass insulating tube 41. As illustrated, this glass insulating tube is adapted to be inserted in suitable cylindrical recesses provided respectively in the surface of the plate 36 and the flange 37 and there engages in confronting relation the packing material 39. It is thus apparent that the cathode assembly consisting of the lead-in electrodes 21 and 22 are respectively insulated from each other and from their supporting structure and further that the supporting structure is insulated from the housing for chamber 15 through the glass sleeve and the insulated bushings 35. The bushings 35 are adapted to support the bolts 38 which are threaded into tapped openings in the flange 37 to compress the packing and sealing material 39 between the confronting surfaces of the glass cylinder 41 and the walls of the recesses cut respectively in the plate 36 and the flange 27.

The anode assembly comprises a cylindrical block 44 of copper or other good thermal conductive material shown supported by a platform 45 attached to the flange 49 to extend through the opening 46 of the chamber 15 into spaced and confronting relationship of the cathode assembly 16. This block comprising the anode electrode is also shown supported and insulated in sealed relation with the flange 48 by a glass sleeve 47 and packing rings 42 in a manner similar to that utilized in the cathode assembly. The platform 45 is is provided with suitable drilled openings as at 50 adapted to communicate with the opposite ends of the serpentine-like groove 52 that is cut in the bottom of the supporting block 44 for the anode cup 53 whereby suitable cooling fluid may be circulated through these drilled openings and through the serpentine groove formed in the block to effectively and uniformly cool the entire surface area of the supporting block. The anode cup 53 and the supporting block 44 are both formed of copper or other good thermal conductive material and are shown spaced from each other by a short distance D by means of the cylindrical flange 56 which abuts a shoulder 60 of the block formed by cutting away a portion thereof to accommodate a flange portion of the anode cup. As illustrated in Figure 3, the cylindrical flange portion 56 of the cup is cut axially into a plurality of segments 58 each of substantially equal circumference and the inner surface of each of these segments is milled down to provide a flat surface and is drilled to receive a screw indicated at 57 in the drawing and shown adapted to be threaded into corresponding radially tapped openings 59 drilled in the supporting block 44. Since the inside surface of each of the segments 58 of the cylindrical projection 56 of the anode cup are flat there will be only a line contact with the cylindrical surface of the supporting block 44. Accordingly, any heat transfer taking place by means of thermal conduction from the anode cup to the supporting block will be through the end surfaces of each segment and shoulder of the block indicated at 60. In order to interchange by increasing thermal conductivity on the thermal conductive path between the segments 58 and the supporting block 44, the screws 57 are tightened down to clamp the particular segment through which the screw passes tightly against the abutting cylindrical surface of the block 44 to increase thereby the surface area of contact between this segment of the flange 56 and water or liquid cooled block 44.

The anode cup is shown provided with a conically-shaped recess 61 and with an outwardly extending flange 62 at the lip of the opening. The source metal that is to be vaporized and subsequently ionized in the ion source employing this cup-like anode is machined down to dimensions corresponding to the conical-shape of the recess 61 in the anode cup 53. In operating the apparatus illustrated in the drawing the conical plug of source metal is inserted into the conical recess in the cup-like anode and the required number of segments 58 are brought into good thermal contact with a portion of the cylindrical surface of the block 44 by tightening down on the screws for each of the said segments. The electrodes 18 and 53 are then assembled into the chamber 15 in confronting and spaced relation. After the enclosed chamber has been brought to the desired low pressure the filament is connected to the source of heating current and brought to the desired electron emissive temperature. Thereafter, the filament assembly 16 and the anode assembly 17 are connected in circuit with a suitable direct current voltage, and the electron emission of the filament bombards the anode surface to raise the temperature of the source metal plug over an area directly opposite the filament to its vaporization point.

When the plug of source metal is first installed, it is preferred to provide no liquid coolant to the block 44 so that the contacting surfaces of the source metal plug and the walls of the cup 53 may be fused to provide a good thermally conductive path. Thereafter, the cooling liquid is circulated through the conduits 63 and 64 communicating with the drilled openings in the cylindrical block to effectively cool the table supporting the cup-like anode. It may also be desirable for initially starting an arc discharge between the filament and the solid anode block of source metal to cover the exposed surface of the source metal block with some readily vaporizable impurities, powdered source metal or source metal shavings being suitable for this purpose. This powered source metal or irregular surface source metal deposits are readily vaporizable and provide the vapors for causing the transition from an electron discharge to an arc discharge.

After the arc discharge has been brought to stable operating conditions, the electric field may be established between the arc electrodes and the accelerating electrode 10 for withdrawing the ions from the plasma and causing these ions to contribute to the formation of an ion beam. Furthermore, a suitable magnetic field is provided in the direction of the arrow M and this magnetic field is generally confined to the iron forming the cathode supporting structure, and serves to collimate the electrons of the arc discharge and to restrict the region of the vaporization of the anode material. It is further apparent that the distance of separation between the anode and the cathode may be altered in the arrangement shown in the drawings and also that the amount of heat transferred through conduction from the anode cup to its supporting block may be accurately controlled by clamping down or releasing the segments of the flange by means of which the cup is secured to the supporting block.

Generally, the conditions of operation are such that the number of these segments which must be screwed down to provide good thermal contact can be determined before the electrodes are assembled in the chamber 15 and evacuation begun. However, if after the initial operating condition has been established it is found that the heat transfer is insufficient to prevent an undue alloying of the source metal with the copper of the anode cup, the apparatus is then shut down and opened up and the number of segments that are clamped in good thermal contact are increased to avoid the alloying action, resulting from insufficient heat transfer. Conversely, if it is found in operating the apparatus that the arc is unstable due to the fact that the vapor generation is insufficient to sustain the arc it may be desirable, under these conditions, to stop operation, open up the apparatus and decrease the number of segments which are clamped in good thermal conductive relation supporting the anode cup to decrease the amount of heat transfer and thereby increase the temperature of the anode at its point directly opposite the cathode for increasing the vapor evolved at this point.

In the foregoing there have been disclosed the features of certain new and improved sources for vaporizing and ionizing isotopic source metals. The disclosed improvements are all made possible by the present discovery that a large massive block of source metal comprising the anode of an arc discharge will provide sufficient surface area for conduction and radiation of the heat developed in the arc to prohibit undue melting of the anode, and at the same time provide sufficient source metal vapor to support the arc, provided the heat transfer between the massive anode block and its supporting structure is precisely controlled. A specific example of a general type of ion source embodying this discovery has been illustrated and described with the understanding, however, that variations in the specific constructional arrangements are within contemplation of the inventors; and that the features of the invention which are believed to be new and useful are expressly pointed out in the appended claims.

What is claimed is:

1. An ion source including a chamber sealed at subatmospheric pressure enclosing a cathode and anode; the latter comprising predominantly a vaporizable material the ions of which are desired, a support for said anode, means for establishing an arc discharge between said anode and cathode for both vaporizing and ionizing said material, said support being formed of a metal alloying with said material to lower the melting point of said supporting metal, means for cooling said support to control the degree of alloying thereof with said material, and means for withdrawing said ions from the region of said arc.

2. An ion source arc structure comprising a cathode, an anode containing the material to be vaporized and ionized, a support for said anode, means for establishing an arc discharge between said cathode and said anode for vaporizing and ionizing portions of said material, means for cooling said support to control the vaporization of said anode, and means for withdrawing said ions from the region of said arc.

3. An ion source arc structure comprising a cathode, an anode containing the material to be vaporized and ionized, a support for said anode, means for establishing an arc discharge between said cathode and said anode for vaporizing and ionizing portions of said material, means for confining said arc to a limited region over the surface of said anode to restrict the area of said anode over which said material is vaporized, means for cooling said support and means for variably controlling thermal conduction between said anode and said support.

4. An ion source arc structure comprising a cathode, an anode containing the material to be vaporized, and ionized, a support for said anode, means for establishing an arc discharge between said cathode and said anode for vaporizing and ionizing a portion of said anode material, means for cooling said support and means for variably controlling the thermal conduction between said anode and said support, whereby to control the melting and vaporization of said anode material.

5. The combination defined in claim 4 characterized further by the addition thereto of means for providing a magnetic field in the direction of said arc for confining said arc to a limited region of the surface of said anode directly confronting said cathode.

6. An apparatus for generating gaseous ions of a predetermined metal under vacuum, said metal having a high vaporization temperature and characterized by a pronounced tendency to alloy or react with other metals and/or refractory materials, the combination that includes a massive cup-like anode of thermally conductive material adapted to support within the cup recess thereof the said predetermined metal in good thermal and electrical conductive relation therewith, an electron emissive cathode spaced from said anode in confronting relation with the surface of said metal, means including said cathode and said anode in an electric circuit to establish an electron stream therebetween for vaporizing and ionizing said metal, means for collimating said electron stream to confine the bombarded area on the surface of said metal, and means for providing a predetermined temperature gradient from said area, through said metal to the region of contact between said metal and cup whereby the melting temperature of said metal may be confined to a zone surrounding said area but having an expanse less than the distance from said area to said region.

No references cited.